United States Patent
Shih et al.

(10) Patent No.: US 12,119,699 B2
(45) Date of Patent: Oct. 15, 2024

(54) METHOD FOR PERIODICALLY ACTIVATING BATTERY UNIT AND ELECTRONIC DEVICE

(71) Applicant: TAIWAN FU HSING INDUSTRIAL CO., LTD., Kaohsiung (TW)

(72) Inventors: I-Chang Shih, Tainan (TW); Pi-Shun Chang, Kaohsiung (TW); Shih-Min Lu, Kaohsiung (TW)

(73) Assignee: TAIWAN FU HSING INDUSTRIAL CO., LTD., Kaohsiung (TW)

( * ) Notice: Subject to any disclaimer, the term of this patent is extended or adjusted under 35 U.S.C. 154(b) by 341 days.

(21) Appl. No.: 17/525,938

(22) Filed: Nov. 14, 2021

(65) Prior Publication Data
US 2023/0074135 A1 Mar. 9, 2023

(30) Foreign Application Priority Data
Sep. 7, 2021 (TW) .................. 110133162

(51) Int. Cl.
*H02J 7/00* (2006.01)
(52) U.S. Cl.
CPC ...... *H02J 7/007182* (2020.01); *H02J 7/0068* (2013.01)
(58) Field of Classification Search
None
See application file for complete search history.

(56) References Cited

U.S. PATENT DOCUMENTS

| | | | | |
|---|---|---|---|---|
| 2008/0116853 A1* | 5/2008 | Du | ........................ | G01R 31/389 324/426 |
| 2011/0133571 A1* | 6/2011 | Kiyohara | .............. | H02J 7/0029 307/130 |

FOREIGN PATENT DOCUMENTS

| | | |
|---|---|---|
| CN | 102082310 B | 12/2013 |
| CN | 104662730 B | 3/2017 |
| JP | 5728647 | 6/2015 |

* cited by examiner

*Primary Examiner* — Arun C Williams
(74) *Attorney, Agent, or Firm* — Winston Hsu

(57) ABSTRACT

A method for periodically activating a battery unit applied to an electronic device equipped with the battery unit includes steps as follows. A plurality of intervals are defined, wherein each of the intervals has an initial voltage value and a target voltage value, and the initial voltage value is greater than the target voltage value. An activation strategy for each of the intervals is defined. A voltage value of the battery unit is detected. One of the intervals is selected as a selected interval according to the voltage value of the battery unit, wherein the voltage value of the battery unit is less than or equal to the initial voltage value of the selected interval, and the voltage value of the battery unit is greater than the target voltage value of the selected interval. The battery unit is activated according to the activation strategy of the selected interval.

18 Claims, 5 Drawing Sheets

METHOD FOR PERIODICALLY ACTIVATING BATTERY UNIT AND ELECTRONIC DEVICE

BACKGROUND OF THE INVENTION

1. Field of the Invention

The present disclosure relates to a method for periodically activating a battery unit and an electronic device, and more particularly, to a method for periodically activating a battery unit and an electronic device which can reduce the probability of battery leakage.

2. Description of the Prior Art

Currently, electronic products are generally designed for low power consumption and energy saving to increase the service life thereof. However, when such electronic products are equipped with batteries, the batteries are prone to leakage due to long-term placement in the electronic products. The electrolytes inside the batteries are corrosive to metals, and tend to corrode the copper foil of circuit boards or metal springs of battery boxes of the electronic products, which may cause malfunction or damage to the electronic products.

SUMMARY OF THE INVENTION

According to one embodiment, a method for periodically activating a battery unit applied to an electronic device equipped with the battery unit includes steps as follows. A plurality of intervals are defined, wherein each of the intervals has an initial voltage value and a target voltage value, and the initial voltage value is greater than the target voltage value. An activation strategy for each of the intervals is defined. A voltage value of the battery unit is detected. One of the intervals is selected as a selected interval according to the voltage value of the battery unit, wherein the voltage value of the battery unit is less than or equal to the initial voltage value of the selected interval, and the voltage value of the battery unit is greater than the target voltage value of the selected interval. The battery unit is activated according to the activation strategy of the selected interval.

According to another embodiment, a method for periodically activating a battery unit applied to an electronic device equipped with the battery unit includes steps as follows. A plurality of activation time points are defined, wherein each of the activation time points corresponds to a target voltage value. A voltage value of the battery unit is detected when a usage time of the battery unit reaches one of the activation time points. Whether the voltage value of the battery unit is greater than the target voltage value corresponding to the reached activation time point is determined. When the voltage value of the battery unit is greater than the target voltage value corresponding to the reached activation time point, the battery unit is activated till the voltage value of the battery unit is equal to the target voltage value corresponding to the reached activation time point.

According to further another embodiment, an electronic device includes a control unit, a battery unit and a predetermined energy consumption unit. The battery unit is electrically connected to the control unit. The predetermined energy consumption unit is electrically connected to the control unit and the battery unit. The control unit is configured to: define a plurality of intervals, wherein each of the intervals has an initial voltage value and a target voltage value, and the initial voltage value is greater than the target voltage value; define an activation strategy for each of the intervals; detect a voltage value of the battery unit; select one of the intervals as a selected interval according to the voltage value of the battery unit, wherein the voltage value of the battery unit is less than or equal to the initial voltage value of the selected interval, and the voltage value of the battery unit is greater than the target voltage value of the selected interval; and activate the battery unit according to the activation strategy of the selected interval.

According to yet another embodiment, an electronic device includes a control unit, a battery unit and a predetermined energy consumption unit. The battery unit is electrically connected to the control unit. The predetermined energy consumption unit is electrically connected to the control unit and the battery unit. The control unit is configured to: define a plurality of activation time points, wherein each of the activation time points corresponds to a target voltage value; detect a voltage value of the battery unit when a usage time of the battery unit reaches one of the activation time points; and determine whether the voltage value of the battery unit is greater than the target voltage value corresponding to the reached activation time point. When the voltage value of the battery unit is greater than the target voltage value corresponding to the reached activation time point, the battery unit is activated till the voltage value of the battery unit is equal to the target voltage value corresponding to the reached activation time point.

These and other objectives of the present invention will no doubt become obvious to those of ordinary skill in the art after reading the following detailed description of the preferred embodiment that is illustrated in the various figures and drawings.

DETAILED DESCRIPTION

In the following detailed description of the embodiments, reference is made to the accompanying drawings which form a part hereof, and in which is shown by way of illustration specific embodiments in which the disclosure may be practiced. In addition, identical numeral references or similar numeral references are used for identical components or similar components in the following embodiments. The phrase "one component being connected electrically to another component" refers that the components can transmit electrical signals directly, indirectly, wired or wirelessly.

According to the present disclosure, the phrase "activating the battery unit"/"the battery unit being activated" refers to the process that the battery unit discharges/consumes power when the electronic device is in standby mode.

Figure 1:
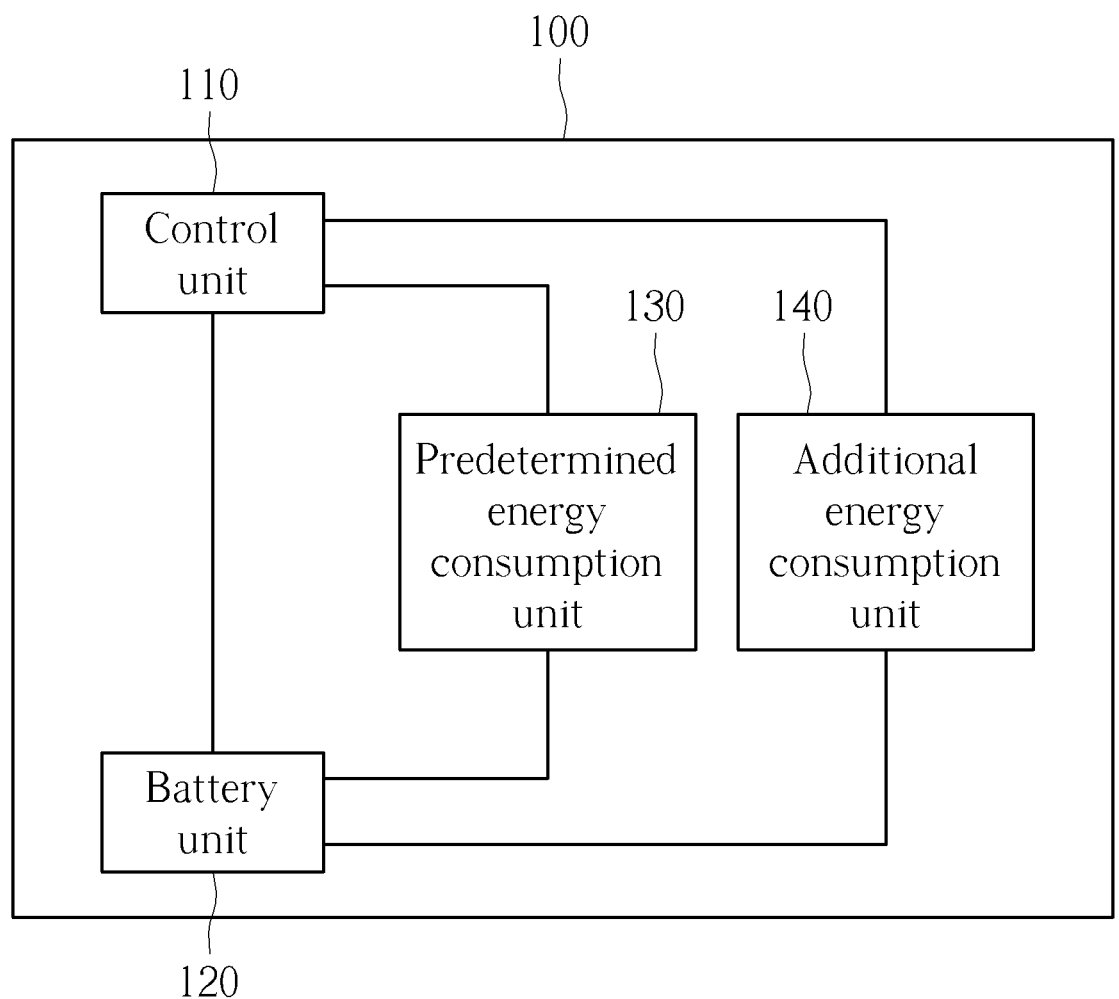
FIG. 1 is a functional block diagram of an electronic device according to one embodiment of the present disclosure.

Please refer to FIG. 1, which is a functional block diagram of an electronic device 100 according to one embodiment of the present disclosure. The electronic device 100 includes a control unit 110, a battery unit 120 and a predetermined energy consumption unit 130. The electronic device 100 may selectively include an additional energy consumption unit 140. The battery unit 120 is electrically connected to the control unit 110. The predetermined energy consumption unit 130 is electrically connected to the control unit 110 and the battery unit 120. The additional energy consumption unit 140 is electrically connected to the control unit 110 and the battery unit 120. The control unit 110 is configured to control the battery unit 120, the predetermined energy consumption unit 130 and the additional energy consumption unit 140. The battery unit 120 is configured to provide power to the control unit 110, the predetermined energy consumption unit 130 and the additional energy consumption unit 140. The control unit 110 has capabilities of analysis and calculation. The control unit 110 can be, but is limited to, a central processing unit (CPU) or a microcontroller. The battery unit 120 can be a single battery or multiple batteries, and the multiple batteries can be connected in parallel and/or in series. The predetermined energy consumption unit 130 is an object of the electronic device 100 to which the battery unit 120 is predetermined to provide power. For example, when the electronic device 100 is an electronic lock, the predetermined energy consumption unit 130 can be a motor. The motor is configured to drive a lock unit of the electronic lock, such that the electronic lock can be switched between an unlocked state and a locked state. For example, when the electronic device 100 is a warning device, the predetermined energy consumption unit 130 can be an indicator light and/or a buzzer. When an abnormality is detected by the control unit 110, the indicator light and/or the buzzer can be activated by the control unit 110 to glow and/or make sounds. The additional energy consumption unit 140 can be configured to consume power of the battery unit 120 when the battery unit 120 is activated.

Figure 2:
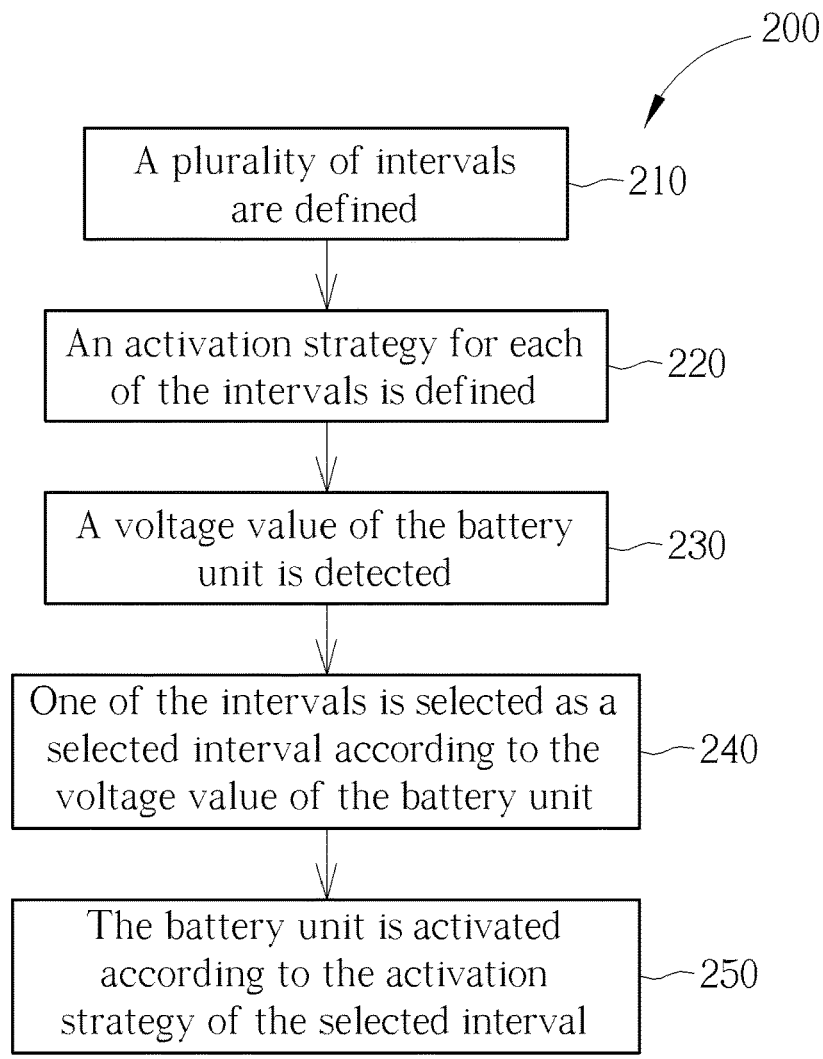
FIG. 2 is a flow chart of a method for periodically activating a battery unit according to one embodiment of the present disclosure.

Please refer to FIG. 2, which is a flow chart of a method 200 for periodically activating a battery unit according to one embodiment of the present disclosure. The control unit 110 is configured to perform the method 200 for periodically activating the battery unit. The method 200 for periodically activating the battery unit includes Steps 210 to 250.

In Step 210, a plurality of intervals are defined, wherein each of the intervals has an initial voltage value and a target voltage value, and the initial voltage value is greater than the target voltage value. According to one embodiment of the present disclosure, the plurality of intervals are divided according to voltage values. When the intervals are continuous, the target voltage value of one of the intervals is the initial voltage value of the following interval. For example, when the intervals include a first interval and a second interval, and the first interval and the second interval are continuous (i.e., the second interval is adjacent to the first interval), the target voltage value of the first interval is the initial voltage value of the second interval.

In Step 220, an activation strategy for each of the intervals is defined. According to one embodiment of the present disclosure, the activation strategy for each of the intervals is to activate the battery unit 120 according to an activation frequency. The activation frequency refers to activate the battery unit 120 a fixed number of times within a fixed time, and the activation frequencies of the intervals may be the same or different. In addition, the activation strategy can be defined according to the voltage values that the battery unit 120 should reach at different usage time points under normal usage frequency.

In Step 230, a voltage value of the battery unit 120 is detected. According to one embodiment of the present disclosure, the control unit 110 can detect the voltage value of the battery unit 120 at regular time intervals. For example, the control unit 110 can detect the voltage value of the battery unit 120 once a day, once a week, or once an hour.

In Step 240, one of the intervals is selected as a selected interval according to the voltage value of the battery unit 120, wherein the voltage value of the battery unit 120 is less than or equal to the initial voltage value of the selected interval, and the voltage value of the battery unit 120 is greater than the target voltage value of the selected interval. In Step 250, the battery unit 120 is activated according to the activation strategy of the selected interval.

Figure 3:
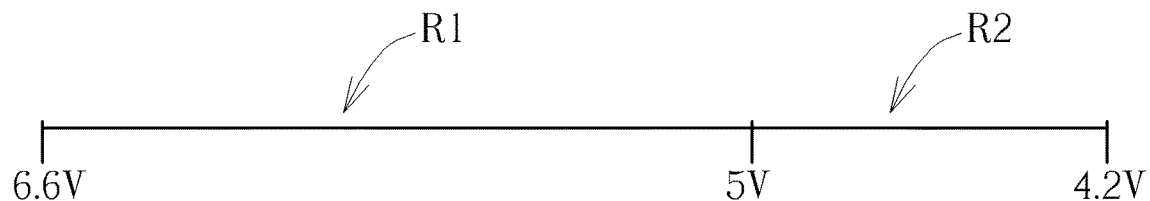
FIG. 3 is a schematic view showing an embodiment of the method for periodically activating the battery unit of FIG. 2.

The method 200 for periodically activating the battery unit of FIG. 2 will be described in detail by making reference to FIG. 3. FIG. 3 is a schematic view showing an embodiment of the method 200 for periodically activating the battery unit of FIG. 2. In FIG. 3, two intervals are defined, which are the first interval R1 and the second interval R2, respectively. Each of the first interval R1 and the second interval R2 has an initial voltage value and a target voltage value. The initial voltage value and the target voltage value of each of the first interval R1 and the second interval R2 are defined as follows. Assume that the highest voltage value of the battery unit 120 of the electronic device 100 is about 6.6 V (in practical, the highest voltage value will fluctuate according to the actual voltage value of each of the batteries in the battery unit 120), the lowest voltage value that allows the electronic device 100 to function normally is about 4.2 V, and the predetermined service life of the battery unit 120 is one year. The predetermined service life is the required time that the voltage value of the battery unit 120 drops from 6.6 V to 4.2 V under normal usage frequency. Based on the power consumption of the control unit 110 and the predetermined energy consumption unit 130, it is estimated that the voltage value of the battery unit 120 is about 5V after half a year under normal usage frequency. Therefore, the initial voltage value of the first interval R1 is defined as 6.6 V, the target voltage value of the first interval R1 is defined as 5 V, the initial voltage value of the second interval R2 is defined as 5V, and the target voltage value of the second interval R2 is defined as 4.2 V (Step 210).

Afterwards, the activation strategy of each of the first interval R1 and the second interval R2 are defined. For example, an activation frequency f1 of the first interval R1 can be defined as 3 times per week, that is, f1=3 times/week, and an activation frequency f2 of the second interval R2 can be defined as 2 times per week, that is, f2=2 times/week (Step 220). In the embodiment, the activation frequency f1>the activation frequency f2, which is defined based on the discharge characteristics of general batteries. In General, the decay speed of the power of the battery in the early period is slower than that in the later period. Therefore, the first interval R1 with a slower decay speed is arranged with a higher activation frequency f1, and the second interval R2 with a faster decay speed is arranged with a lower activation frequency f2. However, the present disclosure is not limited thereto. The number of the intervals, the initial voltage value and the target voltage value of each of the intervals, the predetermined service life and the activation frequencies are exemplary, which are arranged to allow the battery unit 120 to drain out of power within the predetermined service life and thus can be adjusted according to practical needs. For example, the usage time of the battery unit 120 corresponding to the first interval R1 can be lengthened (e.g., from half a year to 8 months), the usage time of the battery unit 120 corresponding to the second interval R2 can be shortened (e.g., from half a year to 4 months), the target voltage value of the first interval R1 (also the initial voltage value of the second interval R2) can be lowered, and the activation frequency f1 can be adjusted to equal to the activation frequency f2.

Afterward, the voltage value of the battery unit 120 is detected at regular time intervals (Step 230). Assuming that the detected voltage value is 5.6 V, which falls within the voltage range of the first interval R1, the first interval R1 is selected as the selected interval (Step 240), and the battery unit 120 is activated according to the activation frequency f1 of the first interval R1 (Step 250). Assuming that the detected voltage value is 4.8V, which falls within the voltage range of the second interval R2, the second interval R2 is selected as the selected interval (Step 240), and the battery unit 120 is activated according to the activation frequency f2 of the second interval R2 (Step 250).

According to the method 200 for periodically activating the battery unit of the present disclosure, even the electronic device 100 is in the standby mode for a long time (for example, the usage frequency of the electronic device 100 is low, or the user goes out for a long time and thus the electronic device 100 is idle), resulting in the power consumed by the control unit 110 and the predetermined energy consumption unit 130 is limited, the power of the battery unit 120 can be consumed appropriately by activating the battery unit 120 according to the activation strategy of the selected interval. It is beneficial to the battery unit 120 to drain out of power within the predetermined service life, and can prevent the battery unit 120 from leakage due to long-term placement in the electronic device 100. Accordingly, malfunction or damage of the electronic device 100 can be prevented. Furthermore, the activation strategy is defined according to the voltage value that the battery unit 120 should reach at different usage time points under normal usage frequency, which can avoid over-activating the battery unit 120 and causing the battery unit 120 to drain out of power prematurely.

Figure 4:
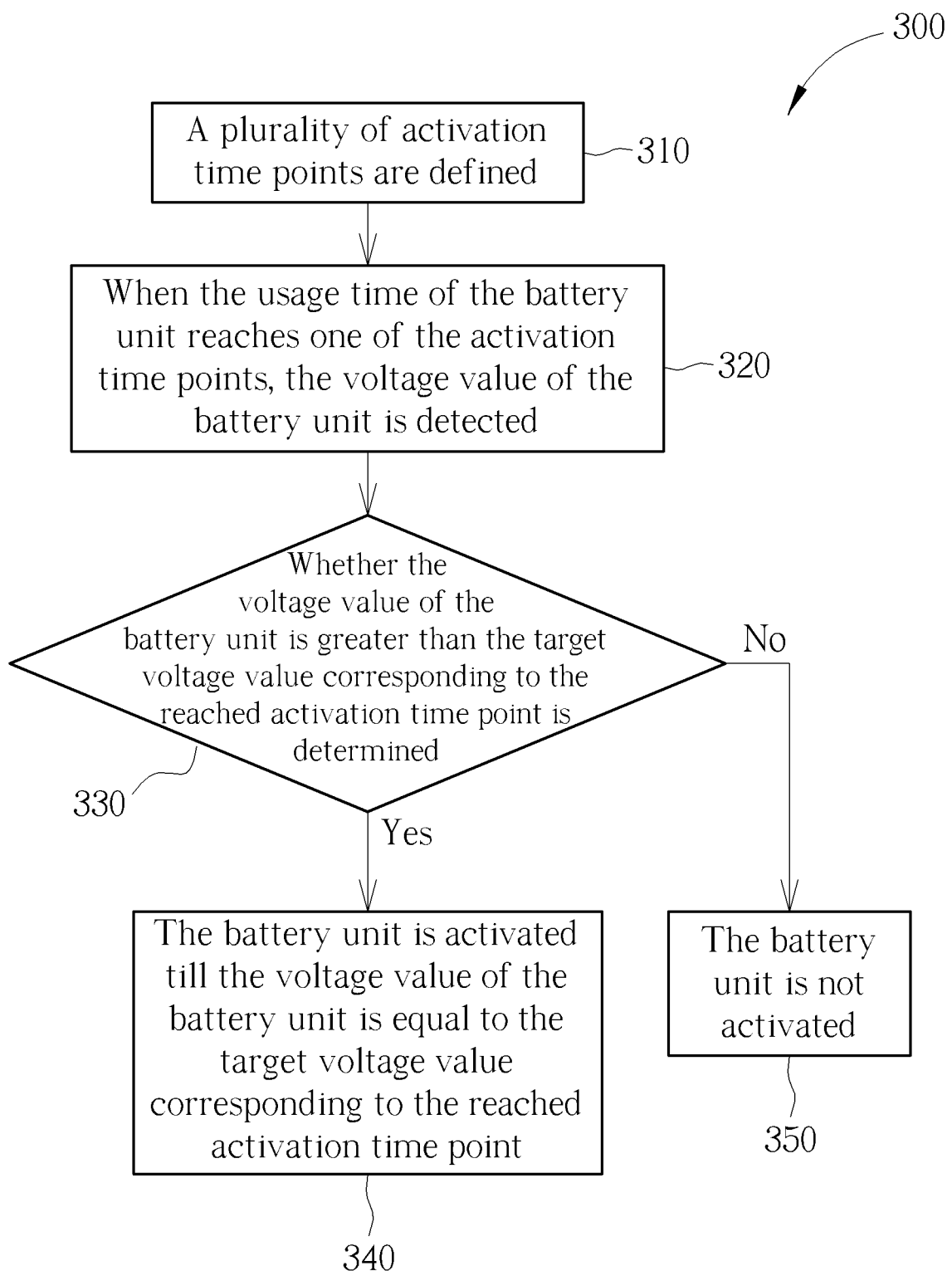
FIG. 4 is a flow chart of a method for periodically activating a battery unit according to another embodiment of the present disclosure.

Please refer to FIG. 4, which is a flow chart of a method 300 for periodically activating a battery unit according to another embodiment of the present disclosure. The control unit 110 is configured to perform the method 300 for periodically activating the battery unit. The method 300 for periodically activating the battery unit includes Steps 310 to 350.

Figure 5:
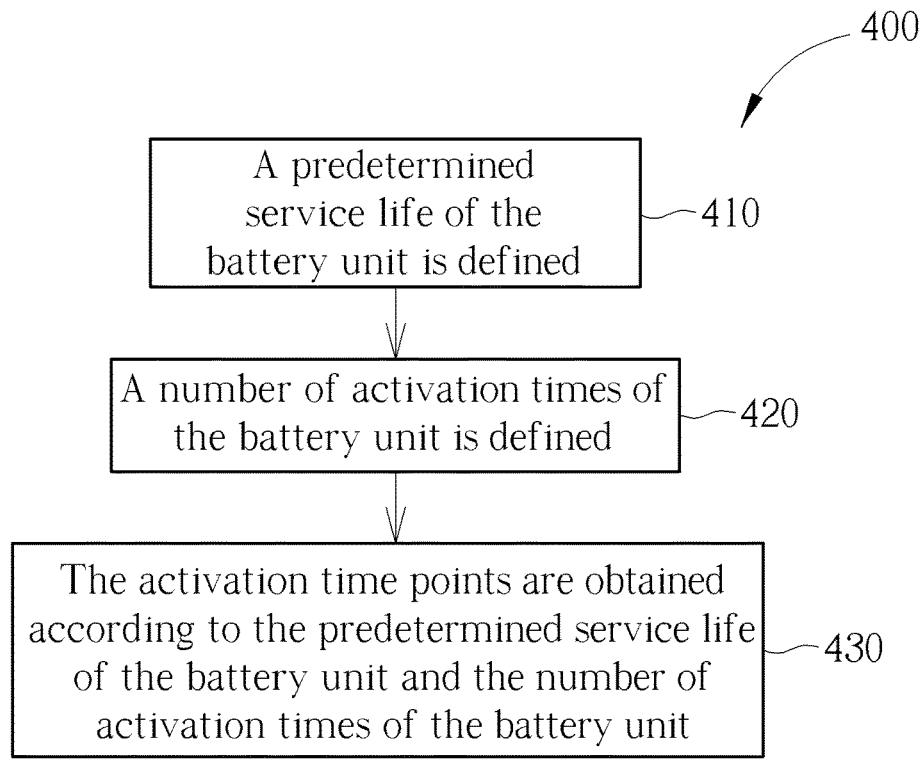
FIG. 5 is a flow chart of a method for defining activation time points according to one embodiment of the present disclosure.
Figure 6:
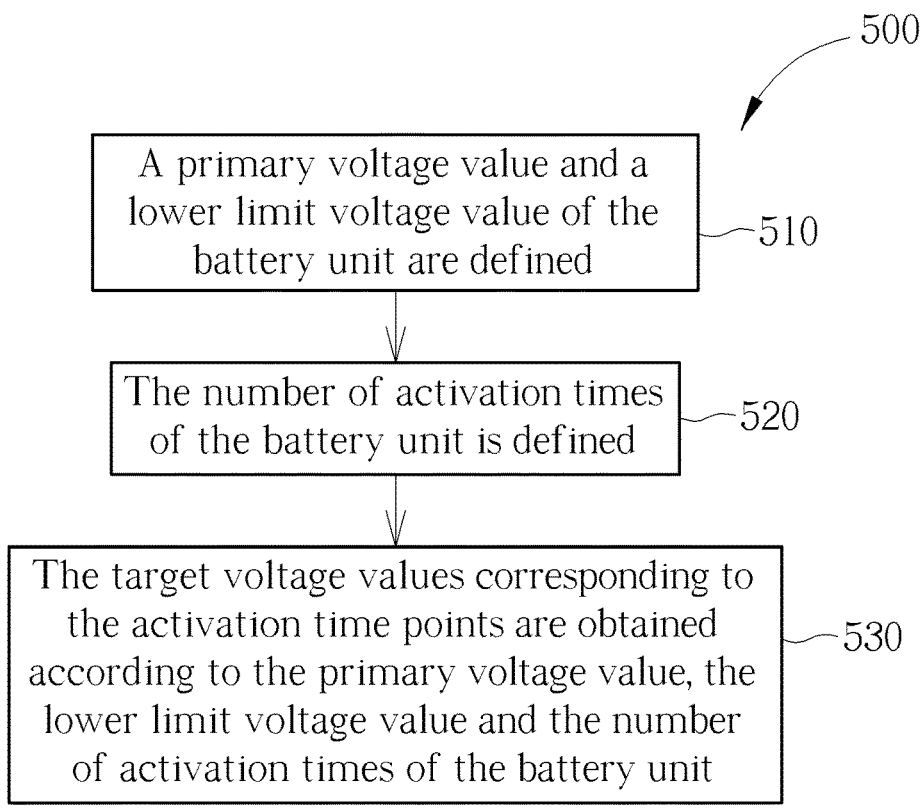
FIG. 6 is a flow chart of a method for defining target voltage values corresponding to the activation time points according to one embodiment of the present disclosure.

In Step 310, a plurality of activation time points are defined, wherein each of the activation time points corresponds to a target voltage value. Please refer to FIG. 5, which is a flow chart of a method 400 for defining the activation time points according to one embodiment of the present disclosure. The method 400 for defining the activation time points includes Step 410 to 430. In Step 410, a predetermined service life of the battery unit 120 is defined. In Step 420, a number of activation times of the battery unit 120 is defined. In Step 430, the activation time points are obtained according to the predetermined service life of the battery unit 120 and the number of activation times of the battery unit 120. For example, a time interval between two adjacent activation time points of the activation time points can be obtained by dividing the predetermined service life of the battery unit 120 by the number of activation times of the battery unit 120. Please refer to FIG. 6, which is a flowchart of a method 500 for defining target voltage values corresponding to the activation time points according to one embodiment of the present disclosure. The method 500 for defining target voltage values corresponding to the activation time points includes Step 510 to 530. In Step 510, a primary voltage value and a lower limit voltage value of the battery unit 120 are defined, where the primary voltage value is the highest voltage value of the battery unit 120, and the lower limit voltage value is the lowest voltage value allowing the electronic device 100 to function normally. In Step 520, the number of activation times of the battery unit 120 is defined. In Step 530, the target voltage values corresponding to the activation time points are obtained according to the primary voltage value, the lower limit voltage value and the number of activation times of the battery unit 120. For example, a voltage interval between two target voltage values corresponding to two adjacent activation time points of the activation time points is obtained by dividing a difference between the primary voltage value and the lower limit voltage value of the battery unit 120 by the number of activation times of the battery unit 120.

It should be noted that, in this embodiment, the time interval between two adjacent activation time points of the activation time points is obtained by dividing the predetermined service life of the battery unit 120 by the number of activation times of the battery unit 120. However, the present disclosure is not limited thereto. Specifically, the time intervals between any two adjacent activation time points can be different. For example, the time interval between two adjacent activation time points in the early period can be longer than that in the later period. Alternatively, the time interval between two adjacent activation time points in the early period can be shorter than that in the later period.

Moreover, in the embodiment, the target voltage value of the activation time point is set based on the fact that "the voltage interval between two target voltage values corresponding to two adjacent activation time points of the activation time points is obtained by dividing a difference between the primary voltage value and the lower limit voltage value of the battery unit 120 by the number of activation times of the battery unit 120". However, the present disclosure is not limited thereto. In other embodiment, the target voltage values of the activation time points can be set according to the voltage values that the battery unit 120 should reach at different usage time points under normal usage frequency, or the target voltage values of the activation time points can be set based on the discharge characteristics of general batteries, wherein the decay speed of the power of the battery in the early period is slower than that in the later period.

Figure 7:
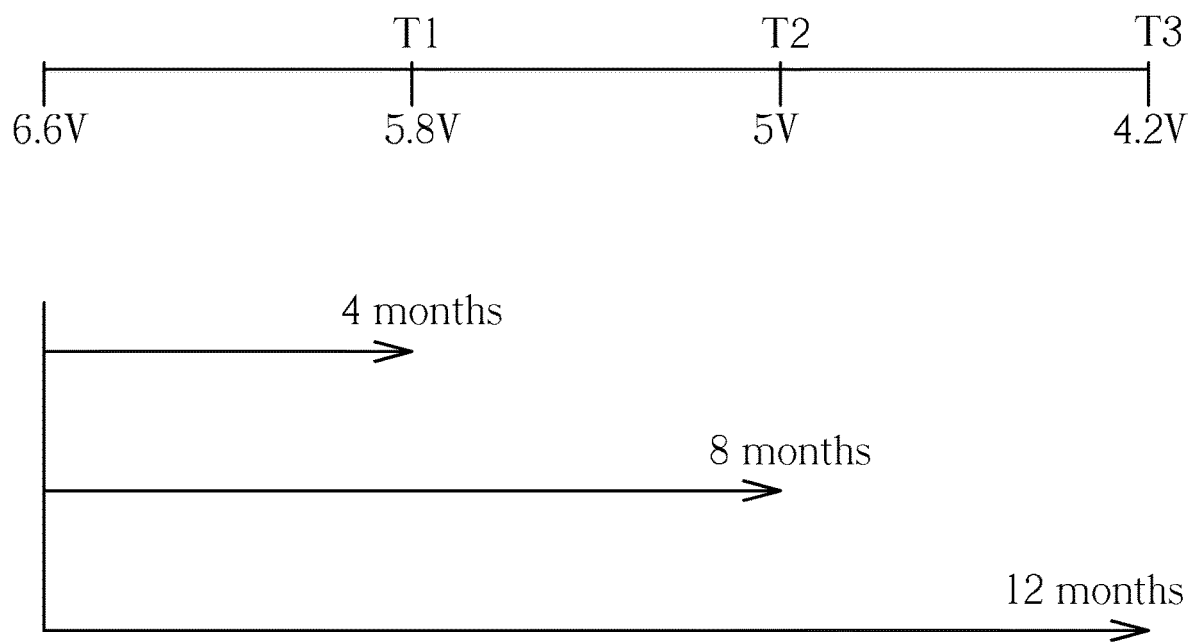
FIG. 7 is a schematic view showing an embodiment of the method for periodically activating the battery unit of FIG. 4.

Please refer back to FIG. 4. In Step 320, when the usage time of the battery unit 120 reaches one of the activation time points, the voltage value of the battery unit 120 is detected. In Step 330, whether the voltage value of the battery unit 120 is greater than the target voltage value corresponding to the reached activation time point is determined. When the voltage value of the battery unit 120 is greater than the target voltage value corresponding to the reached activation time point, Step 340 is performed, in which the battery unit 120 is activated till the voltage value of the battery unit 120 is equal to the target voltage value corresponding to the reached activation time point. When the voltage value of the battery unit 120 is less than or equal to the target voltage value corresponding to the reached activation time point, Step 350 is performed, in which the battery unit 120 is not activated. After that, go back to Step 320 (not shown in the FIG. 4). The method 300 for periodically activating the battery unit of FIG. 4 will be described in detail by making reference to FIG. 7. FIG. 7 is a schematic view showing an embodiment of the method 300 for periodically activating the battery unit of FIG. 4. In FIG. 7, three activation time points are defined, which are a first activation time point T1, a second activation time point T2 and a third activation time point T3, respectively. The method for defining the first activation time point T1, the second activation time point T2 and the third activation time point T3 are exemplarily illustrated as follows. The predetermined service life of the battery unit 120 is defined as one year (Step 410). The number of activation times of the battery unit 120 is defined as three (Step 420). The time interval between two adjacent of the first activation time point T1, the second activation time point T2 and the third activation time point T3 is four months, which is obtained by dividing the one year (i.e., twelve months) by three (Step 430). Therefore, the first the activation time point T1, the second the activation time point T2, and the third the activation time point T3 are four months, eight months, and twelve months after the battery unit 120 being used. Afterward, the first target voltage value V1 of the first activation time point T1, the second target voltage value V2 of the second activation time point T2 and the third target voltage value V3 of the third activation time point T3 are defined. The method for defining the first target voltage value V1, the second target voltage value V2 and the third target voltage value V3 are exemplarily illustrated as follows. The primary voltage value of the battery unit 120 is defined as 6.6 V (i.e., the highest voltage value of the battery unit 120; in practical, the highest voltage value will fluctuate according to the actual voltage value of each of the batteries in the battery unit 120), the lower limit voltage value is defined as 4.2 V (Step 510). The number of activation times of the battery unit 120 is defined as three, which is the same as Step 420 (Step 520). The difference between the primary voltage value and the lower limit voltage value (6.6 V−4.2 V=2.4 V) is divided by three to obtain the voltage interval (0.8 V) between two adjacent of the target voltage values corresponding to the first activation time point T1, the second activation time point T2 and the third activation time point T3. Therefore, the first target voltage value V1, the second target voltage value V2 and the third target voltage value V3 are 5.8 V, 5 V and 4.2 V (Step 530).

Afterwards, when the usage time of the battery unit 120 reaches the first activation time point T1, the voltage value of the battery unit 120 is detected (Step 320). Whether the voltage value of the battery unit 120 is greater than 5.8 V is determined (Step 330). When the voltage value of the battery unit 120 is greater than 5.8 V, which means that the power consumption of the battery unit 120 is too slow and may result in leakage due to long-term placement, the battery unit 120 is activated till the voltage value of the battery unit 120 is equal to 5.8 V (Step 340), such that the power consumption rate of the battery unit 120 can meet the expectation. When the voltage value of the battery unit 120 is less than or equal to 5.8 V, which means that the power consumption rate of the battery unit 120 meets the expectation or has exceeded the expectation. In this case, because the probability of leakage due to long-term placement is low, the battery unit 120 is not activated (Step 350). The next detection will be performed when the usage time of the battery unit 120 reaches the second activation time point T2. The number of the activation time points (T1-T3), the target voltage values (V1-V3) corresponding to the activation time points (T1-T3), the time interval between two adjacent activation time points of the activation time points (T1-T3), the voltage interval between two target voltage values corresponding to two adjacent activation time points of the activation time points (T1-T3), the primary voltage value, the lower limit voltage value are only exemplary and can be adjusted according to practical needs. For example, in other embodiment, the time intervals between the activation time points can be different, the voltage intervals between the target voltage values corresponding to the activation time points can be different, as long as the time intervals and voltage intervals are arranged to allow the battery unit 120 to drain out of power within the predetermined service life.

According to the method 300 for periodically activating a battery unit of the present disclosure, when the electronic device 100 is in the standby mode for a long time, the power consumed by the control unit 110 and the predetermined energy consumption unit 130 is limited. By detecting the voltage value of the battery unit 120 at the activation time point and determining whether to activate the battery unit 120 according to the detected result, it allows the voltage value of the battery unit 120 to be less than or equal to the target voltage value corresponding to the activation time point. It is beneficial to the battery unit 120 to drain out of power within the predetermined service life, and can prevent the battery unit 120 from leakage due to long-term placement in the electronic device 100. Accordingly, malfunction or damage of the electronic device 100 can be prevented.

As mentioned above, the phrase "activating the battery unit"/"the battery unit being activated" refers to the process that the battery unit discharges/consumes power when the electronic device is in standby mode. Therefore, during the process of activating the battery unit 120, the control unit 110 does not drive the predetermined energy consumption unit 130 to consume power. According to one embodiment, the control unit 110 can increase its operating frequency to increase power consumption, or the control unit 110 can drive the additional energy consumption unit 140 to consume power to activate the battery unit 120.

Furthermore, the electronic device 100 can be, but is not limited to, an electronic lock. The electronic devices 100 equipped with the battery unit 120 are all within the scope of the present disclosure.

Comparing to prior art, when the method for periodically activating a battery unit of the present disclosure is applied to an electronic device equipped with the battery unit, it is beneficial to the battery unit to drain out of power within the predetermined service life, and can prevent the battery unit from leakage due to long-term placement in the electronic device. Accordingly, malfunction or damage of the electronic device can be prevented.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:
1. A method for periodically activating a battery unit, comprising:
   providing an electronic device equipped with the battery unit, wherein the electronic device comprises a predetermined energy consumption unit electrically connected to the battery unit and an additional energy consumption unit electrically connected to the battery unit;

defining a plurality of intervals, wherein each of the intervals has an initial voltage value and a target voltage value, and the initial voltage value is greater than the target voltage value;

defining an activation strategy for each of the intervals;

detecting a voltage value of the battery unit;

selecting one of the intervals as a selected interval according to the voltage value of the battery unit, wherein the voltage value of the battery unit is less than or equal to the initial voltage value of the selected interval, and the voltage value of the battery unit is greater than the target voltage value of the selected interval; and activating the battery unit according to the activation strategy of the selected interval, so that the battery unit is allowed to drain out of power within a predetermined service life for preventing the battery unit from leakage, wherein the battery unit being activated is a process that the battery unit discharges power when the electronic device is in standby mode, when the battery unit is activated, the additional energy consumption unit is driven to consume power of the battery unit while the predetermined energy consumption unit is not driven to consume power of the battery unit.

2. The method for periodically activating the battery unit of claim 1, wherein the activation strategy for each of the intervals is to activate the battery unit according to an activation frequency.

3. The method for periodically activating the battery unit of claim 2, wherein the activation frequencies of the intervals are different.

4. The method for periodically activating the battery unit of claim 2, wherein the intervals comprises a first interval and a second interval, the target voltage value of the first interval is the initial voltage value of the second interval, and the activation frequency of the first interval is greater than the activation frequency of the second interval.

5. A method for periodically activating a battery unit, comprising:

providing an electronic device equipped with the battery unit, wherein the electronic device comprises a predetermined energy consumption unit electrically connected to the battery unit and an additional energy consumption unit electrically connected to the battery unit;

defining a plurality of activation time points, wherein each of the activation time points corresponds to a target voltage value;

detecting a voltage value of the battery unit when a usage time of the battery unit reaches one of the activation time points; and determining whether the voltage value of the battery unit is greater than the target voltage value corresponding to the reached activation time point;

wherein when the voltage value of the battery unit is greater than the target voltage value corresponding to the reached activation time point, the battery unit is activated till the voltage value of the battery unit is equal to the target voltage value corresponding to the reached activation time point, so that the battery unit is allowed to drain out of power within a predetermined service life for preventing the battery unit from leakage, the battery unit being activated is a process that the battery unit discharges power when the electronic device is in standby mode, when the battery unit is activated, the additional energy consumption unit is driven to consume power of the battery unit while the predetermined energy consumption unit is not driven to consume power of the battery unit.

6. The method for periodically activating the battery unit of claim 5, wherein when the voltage value of the battery unit is less than or equal to the target voltage value corresponding to the reached activation time point, the battery unit is not activated.

7. The method for periodically activating the battery unit of claim 5, wherein a method for defining the activation time points comprises:

defining the predetermined service life of the battery unit;

defining a number of activation times of the battery unit; and obtaining the activation time points according to the predetermined service life of the battery unit and the number of activation times of the battery unit.

8. The method for periodically activating the battery unit of claim 7, wherein a time interval between two adjacent activation time points of the activation time points is obtained by dividing the predetermined service life of the battery unit by the number of activation times of the battery unit.

9. The method for periodically activating the battery unit of claim 5, wherein a method for defining the target voltage values corresponding to the activation time points comprises:

defining an primary voltage value and a lower limit voltage value of the battery unit, where the primary voltage value is the highest voltage value of the battery unit, and the lower limit voltage value is the lowest voltage value allowing the electronic device to function normally;

defining a number of activation times of the battery unit; and obtaining the target voltage values corresponding to the activation time points according to the primary voltage value, the lower limit voltage value and the number of activation times of the battery unit.

10. The method for periodically activating the battery unit of claim 9, wherein a voltage interval between two target voltage values corresponding to two adjacent activation time points of the activation time points is obtained by dividing a difference between the primary voltage value and the lower limit voltage value of the battery unit by the number of activation times of the battery unit.

11. An electronic device, comprising:

a control unit;

a battery unit electrically connected to the control unit;

a predetermined energy consumption unit electrically connected to the control unit and the battery unit; and an additional energy consumption unit electrically connected to the control unit and the battery unit;

wherein the control unit is configured to:

define a plurality of intervals, wherein each of the intervals has an initial voltage value and a target voltage value, and the initial voltage value is greater than the target voltage value;

define an activation strategy for each of the intervals;

detect a voltage value of the battery unit;

select one of the intervals as a selected interval according to the voltage value of the battery unit, wherein the voltage value of the battery unit is less than or equal to the initial voltage value of the selected interval, and the voltage value of the battery unit is greater than the target voltage value of the selected interval; and activate the battery unit according to the activation strategy of the selected interval, so that the battery unit is allowed to drain out of power within a predetermined service life for preventing the battery unit from leakage, wherein the battery unit being activated is a process that the battery unit discharges power when the electronic device is in standby mode, when the battery unit is activated, the additional energy consumption unit is driven to consume power of the battery unit while the predetermined energy consumption unit is not driven to consume power of the battery unit.

12. The electronic device of claim 11, wherein the activation strategy for each of the intervals is to activate the battery unit according to an activation frequency.

13. The electronic device of claim 12, wherein the intervals comprises a first interval and a second interval, the target voltage value of the first interval is the initial voltage value of the second interval, and the activation frequency of the first interval is greater than the activation frequency of the second interval.

14. An electronic device, comprising:
a control unit;
a battery unit electrically connected to the control unit;
a predetermined energy consumption unit electrically connected to the control unit and the battery unit; and
an additional energy consumption unit electrically connected to the control unit and the battery unit;
wherein the control unit is configured to:
   define a plurality of activation time points, wherein each of the activation time points corresponds to a target voltage value;
   detect a voltage value of the battery unit when a usage time of the battery unit reaches one of the activation time points; and
   determine whether the voltage value of the battery unit is greater than the target voltage value corresponding to the reached activation time point;
   wherein when the voltage value of the battery unit is greater than the target voltage value corresponding to the reached activation time point, the battery unit is activated till the voltage value of the battery unit is equal to the target voltage value corresponding to the reached activation time point, so that the battery unit is allowed to drain out of power within a predetermined service life for preventing the battery unit from leakage, the battery unit being activated is a process that the battery unit discharges power when the electronic device is in standby mode, when the battery unit is activated, the additional energy consumption unit is driven to consume power of the battery unit while the predetermined energy consumption unit is not driven to consume power of the battery unit.

15. The electronic device of claim 14, wherein when the voltage value of the battery unit is less than or equal to the target voltage value corresponding to the reached activation time point, the battery unit is not activated.

16. The electronic device of claim 14, wherein a method for defining the activation time points comprises:
   defining the predetermined service life of the battery unit;
   defining a number of activation times of the battery unit; and
   obtaining the activation time points according to the predetermined service life of the battery unit and the number of activation times of the battery unit.

17. The electronic device of claim 14, wherein a method for defining the target voltage values corresponding to the activation time points comprises:
   defining a primary voltage value and a lower limit voltage value of the battery unit, where the primary voltage value is the highest voltage value of the battery unit, and the lower limit voltage value is the lowest voltage value allowing the electronic device to function normally;
   defining a number of activation times of the battery unit; and
   obtaining the target voltage values corresponding to the activation time points according to the primary voltage value, the lower limit voltage value and the number of activation times of the battery unit.

18. The electronic device of claim 17, wherein a voltage interval between two target voltage values corresponding to two adjacent activation time points of the activation time points is obtained by dividing a difference between the primary voltage value and the lower limit voltage value of the battery unit by the number of activation times of the battery unit.

* * * * *